United States Patent [19]

Bisk

[11] Patent Number: 4,765,495
[45] Date of Patent: Aug. 23, 1988

[54] KNOCK DOWN STORAGE SYSTEM AND ACCESSORIES THEREFOR

[76] Inventor: Leonard Bisk, 7833 Spring Ave., Elkins Park, Pa. 19117

[21] Appl. No.: 573,989

[22] Filed: Jan. 26, 1984

Related U.S. Application Data

[63] Continuation-in-part of Ser. No. 512,285, Jul. 8, 1983, abandoned.

[51] Int. Cl.$^4$ .................................................. A47F 5/08
[52] U.S. Cl. .................................. 211/113; 211/119; 211/181; 24/336; 403/391
[58] Field of Search ............... 211/113, 118, 119, 106, 211/181, 105.1, 123; 220/19; 403/391, 397, 389; 24/336, 339; 248/340, 97

[56] References Cited

U.S. PATENT DOCUMENTS

| | | | |
|---|---|---|---|
| 1,225,611 | 5/1917 | Gatlin | 211/123 |
| 1,626,009 | 4/1927 | Murray | 220/19 X |
| 1,648,025 | 11/1927 | Molloy | 220/19 X |
| 1,777,058 | 9/1930 | Walker | 220/19 |
| 2,480,327 | 8/1949 | Idelsohn | 211/113 |
| 2,790,556 | 4/1957 | Burt | 220/19 X |
| 2,936,146 | 5/1960 | Wunder | 220/19 X |
| 3,208,406 | 9/1965 | Maslow . | |
| 3,743,106 | 7/1973 | Maziarka et al. | 211/123 |
| 3,762,951 | 10/1973 | Hetznecker | 211/123 X |
| 4,136,848 | 1/1979 | McCollum | 248/316.7 |
| 4,319,421 | 3/1982 | Diamond | 248/340 X |
| 4,352,255 | 10/1982 | Warehime | 403/391 X |

FOREIGN PATENT DOCUMENTS

| | | | |
|---|---|---|---|
| 252030 | 11/1962 | Australia | 220/19 |
| 451728 | 4/1913 | France | 211/105.1 |
| 1275250 | 9/1961 | France | 220/19 |
| 603985 | 4/1960 | Italy | 220/19 |
| 217297 | 4/1967 | Sweden | 211/119 |
| 187685 | 10/1922 | United Kingdom | 211/113 |

*Primary Examiner*—Ramon S. Britts
*Assistant Examiner*—Blair M. Johnson
*Attorney, Agent, or Firm*—Caesar, Rivise, Bernstein, Cohen & Pokotilow, Ltd.

[57] ABSTRACT

A knocked down storage system for forming at least one storage bin. The bin is formed of at least four generally planar panels and releasable securement means for securing the panels together. Each panel is formed of a grid-like plastic member which is generally planar and of rectangular profile. The marginal edges of each of the panels include rod-like sections of generally circular cross section. The releasable securement means comprise a clip formed of an elongated plastic member having a pair of longitudinally extending channels. Each of the channels is configured to tightly receive a respective rod-like section of a pair of the panels to secure the panels together to form the storage bin. A pair of plastic hanger brackets are provided to suspend the storage bin from a conventional closet rod. Each bracket includes a loop plate portion adapted for disposition on the closet rod and a pair of leg portions for releasable securement to an associated panel. Additional securement brackets are provided to suspend the storage bin from conventional wire shelving. The latter brackets are each elongated members having an opposed pair of ends. Each end in the form of a loop-like clip having a circular recess and an associated access mouth. One of the recesses is adapted to receive a rod-like portion of the storage bin while the other circular recess is adapted to receive a portion of the wire-like shelving. Accessories in the form of hanger bracket, closet rod, handle and a system stabilizer are also provided.

12 Claims, 7 Drawing Sheets

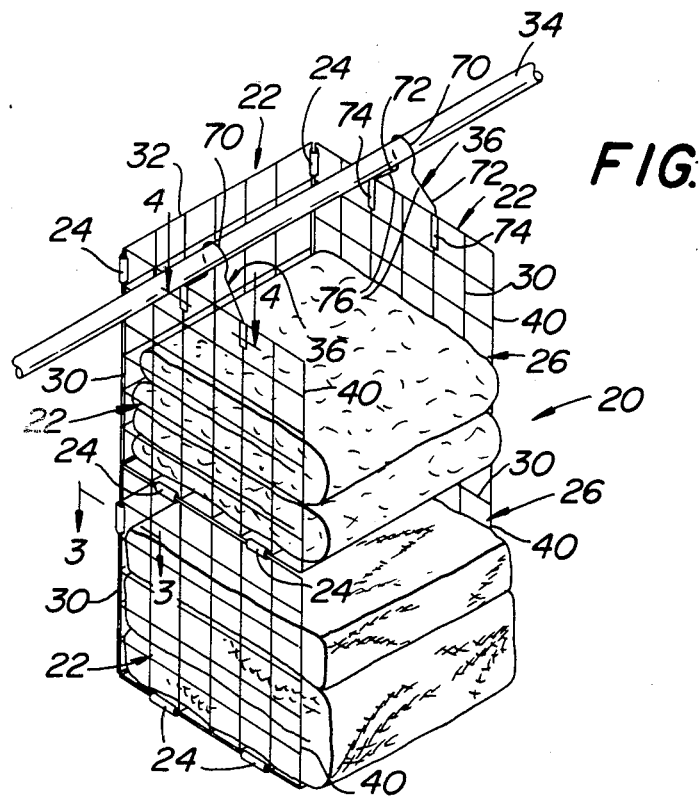
FIG. 1
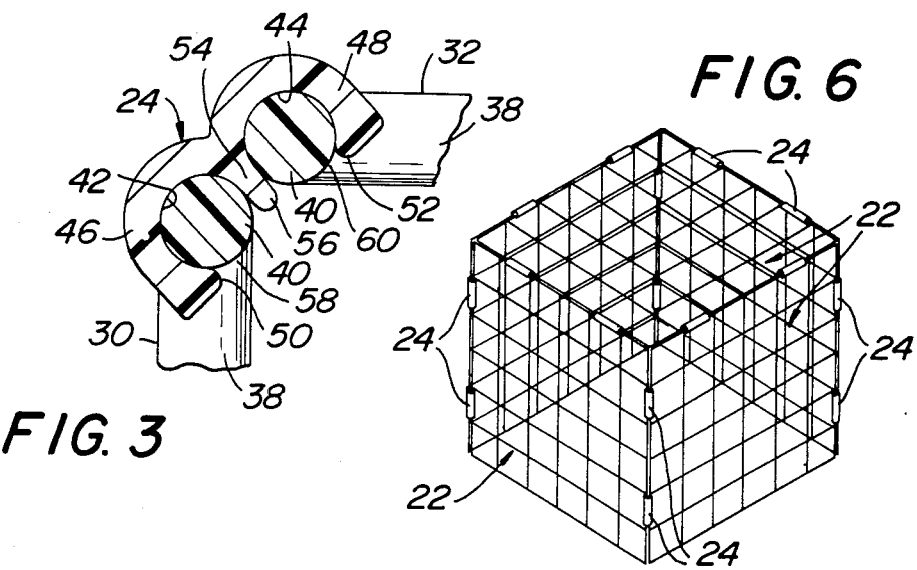
FIG. 3
FIG. 6

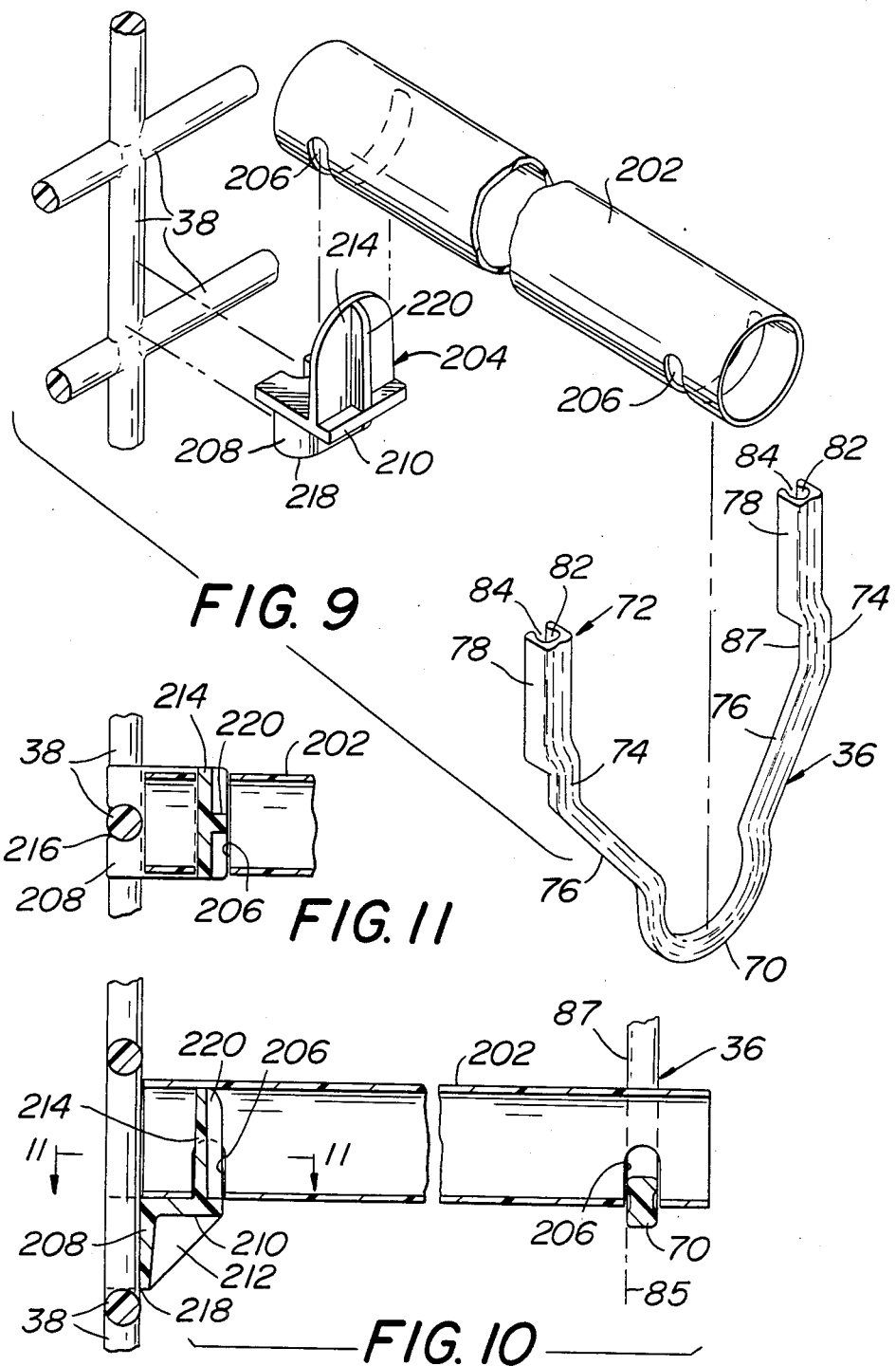

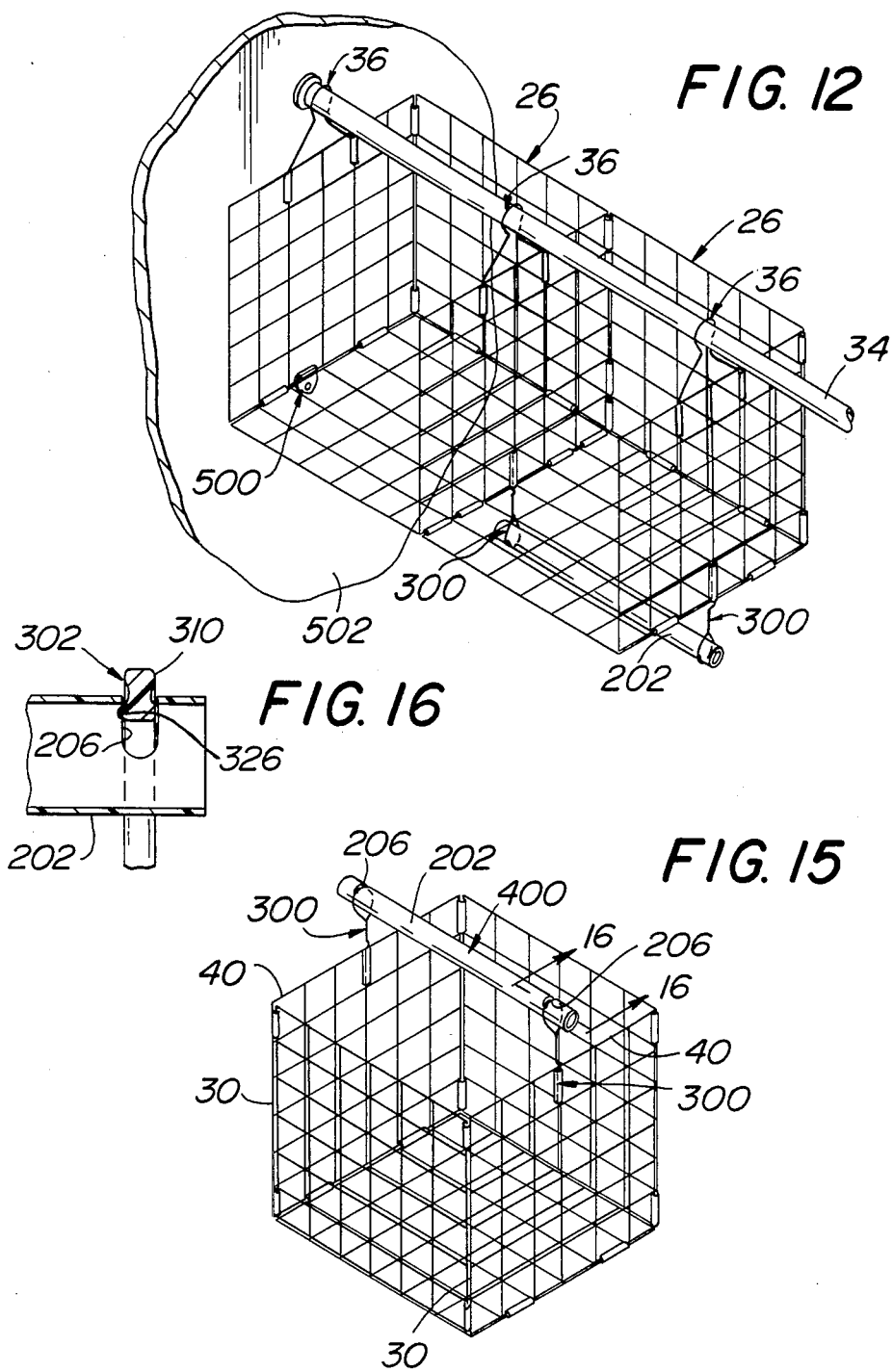

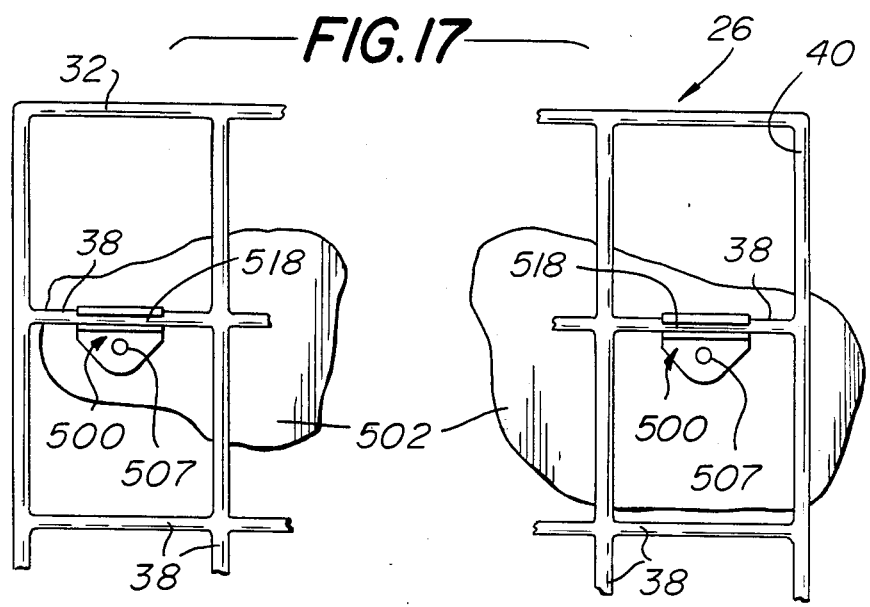

KNOCK DOWN STORAGE SYSTEM AND ACCESSORIES THEREFOR

BACKGROUND OF THE INVENTION

This application is a Continuation-In-Part of my copending U.S. patent application Ser. No. 512,285 filed on Jul. 8, 1983, now abandoned and entitled Knock Down Storage System, whose disclosure is incorporated by reference herein.

This invention relates generally to storage systems and more particularly to modular storage systems arranged to be readily assembled and disassembled.

Various storage systems are commercially available for storing housewares, clothing, or other non-hangable goods in a closet. Examples of such goods are linens, sweaters, shoes, etc. The comercially available storage systems take various forms. One type of closet storage system utilizes a group of shelves and/or dividers which are structurally incorporated into the closet via, mounting standards, brackets or other securement means. The shelves can take various forms, such as solid or wire grid-like constructions that be formed of plastic, metal, vinyl covered wire, etc. Another type of storage system particularly suited for closets entails a free-standing unit which includes various shelves, partitions or compartments and which is disposed on the closet floor adjacent a wall of the closet. Still another form of conventional closet storage systems makes use of sliding wire or plastic baskets which are mounted on a cart or on rigid frames or other supports secured to the closet walls.

While all of the foregoing storage systems are generally suitable for their intended purposes of providing storage compartments in a closet to maximize the closet's storage capacity, such systems nevertheless suffer from one or more disadvantages. Those disadvantages are cost, complexity, inability to be modified to changing storage applications or needs. Moreover, many of the prior art storage systems exhibit disadvantages to the manufacturer and/or merchandiser selling such systems. In this regard, such systems due to their construction take up considerable volume or space, thereby increasing packaging, shipping, warehousing and display costs.

OBJECTS OF THE INVENTION

Accordingly, it is the general object of this invention to provide a storage system which overcomes the disadvantages of the prior art.

It is a further object of this invention to provide a knock-down storage system which can be readily assembled in various configurations.

It is still a further object of the instant invention to provide a storage system arranged for ready assembly in various configurations and which can be readily suspended from a conventional horizontally disposed closet rod.

It is still a further object of the instant invention to provide a storage system arranged for ready assembly in various configurations and which can be readily suspended from conventional wire shelving.

It is yet a further object of the invention to provide a storage system arranged for ready assembly in various configurations and which can be disposed in a free-standing manner on a floor or other horizontal support surface.

It is yet a further object of the instant invention to provide a clip for effecting the ready assembly of a knock-down storage system.

It is yet a further object of the instant invention to provide a suspension bracket for effecting the hanging of a bin or basket from a conventional closet rod.

It is yet a further object of the instant invention to provide a suspension clip for effecting the hanging of a bin or basket from conventional wire shelving.

It is yet a further object of the instant invention to provide a storage system suitable for storing delicate materials therein without presenting any risk of snagging or damage to the materials.

It is yet a further object of the instant invention to provide accessories for the knock down storage system.

It is yet a further object of the instant invention to provide modular means forming an accessory closet rod for the knock down storage system.

It is yet a further object of the instant invention to provide modular handle means for the knock down storage system.

It is yet a further object of the instant invention to provide wall mounting means for the knock down storage system.

It is still a further object of the instant invention to provide stabilization means arranged to stabilize a knock down storage system.

SUMMARY OF THE INVENTION

These and other objects of the instant invention are achieved by providing a knock-down storage system comprising at least three generally planar panels and releasable securement means therefor to connect the panels into a storage receptacle having a pair of side panels and a bottom panel. Each of the panels is formed of a grid-like plastic member which is generally planar and of rectangular (e.g., square) profile. The marginal edges of each of the panels include rod-like sections of generally circular cross section. The releasable securement means comprises a clip formed of an elongated plastic member having a pair of longitudinally extending channels. The channels are configured to closely receive a respective rod-like section of a pair of the panels to secure the panels together to readily assemble the receptacle.

The assembled receptacle can be suspended from a conventional closet rod, via a pair of plastic hanger brackets arranged for releasable securement to the side panels of the receptacle.

Alternatively, the receptacle can be suspended from conventional wire shelving, via four plastic hanger brackets arranged for releasable securement to the side panels of the receptacle and to the wire shelving.

One embodiment of an accessory comprises hanger rod means releaseable secured to the storage system. The hanger rod means comprises an elongated rod member and at least one hanger bracket therefor. The hanger bracket includes a loop-like portion and at least one leg portion for releaseable securement to a rod-like section of one of the side panels. The rod member includes at least one notch therein adjacent one end thereof and adapted to receive the loop-like portion of the hanger bracket to suspend one end of the rod member below the panels.

Another embodiment of an accessory comprises suspension clip means which is located adjacent the other end of the rod-like member for supporting it below the panels.

In another embodiment the accessory comprises a second hanger bracket at the other end of the rod-like member to suspend it. The second hanger bracket includes a loop-like portion and at least one leg portion for releasable securement to a rod-like section of another of the side panels.

In yet another embodiment clip means are provided for fixed securement to a stationary structure and for releaseable securement to the rod-like section of an associated side panel to either mount the system on the wall or to stabilize the system from swinging when the system is suspended using the suspension means of this invention.

DESCRIPTION OF THE DRAWING

FIG. 1 a perspective view of a storage system of the subject invention shown suspended on a conventional closet rod;

FIG. 3 is an enlarged sectional view taken along line 3—3 of FIG. 2;

FIG. 6 is a perspective view of a free standing storage system of the, subject invention;

FIG. 9 is an exploded perspective view of that shown in FIG. 8 and showing the assembly thereof;

FIG. 10 is a sectional view taken along line 10—10 of FIG. 8;

FIG. 11 is a sectional view taken along line 11—11 of FIG. 10;

FIG. 12 is a perspective view of a storage system shown suspended from a conventional closet rod by alternative accessory suspension means and including a closet rod accessory and storage system stabilization clip accessoy;

FIG. 15 is a perspective view of a storage system constructed and including a handle accessory;

FIG. 16 is an enlarged sectional view taken along line 16—16 of FIG. 15; and

FIG. 17 is a front elevational view of a portion of a system mounted on a wall using a wall mounting accessory.

DETAILED DESCRIPTION OF THE PREFERRED EMBODIMENT

Figure 2:
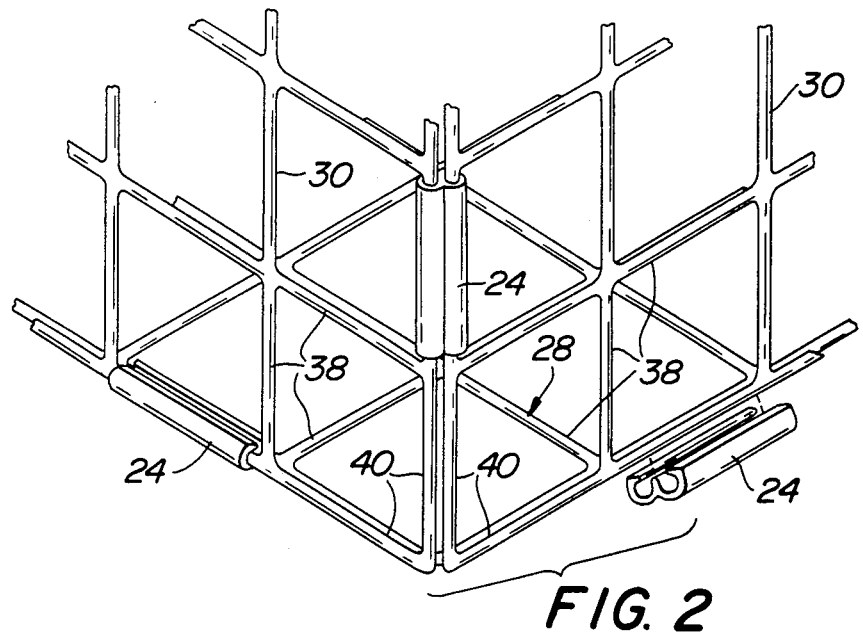
FIG. 2 is an enlarged exploded perspective view of the corner of the receptacle of the system shown in FIG. 1.

Referring now to the various figures of the drawing wherein like characters refer to like parts, there is shown at 20 in FIG. 1 a storage system constructed in accordance with the subject invention.

The system basically comprises plural modular panels 22 which are interconnected with one another, via plural releasable securement means or clips 24, to form at least one storage compartment 26. The storage compartments can be configured in various shapes to form bins, baskets or boxes and can be used either singularly or in combination with others as required by the users for the storage application. Moreover, the system whether composed of single compartments or multiple compartments, can be suspended from conventional means such as closet rods or wire shelving or left freestanding on a floor or support surface, again as desired by the user.

The configuration of the storage compartment for suspended application can take several forms. One such form is a hanging bin or basket having a bottom wall or panel and at least two vertical opposed sidewalls or panels. In the embodiment shown in FIG. 1, each basket 26 includes a bottom panel 28 (FIG. 2) and a pair of vertically oriented side panels 30 and vertically oriented rear panel 32. The panels are releasably secured to each other by plural clips 24, with the contiguous panels being disposed perpendicular to each other. Accordingly, the embodiment shown in FIG. 1 consists of plural three-sided baskets 26, each having an open top and an open front.

The basket system shown in FIG. 1 is suspended from a conventional horizontally disposed closet rod 34 by a pair of hanger brackets 36. Both brackets are constructed in an identical manner and arranged for releasable securement to the basket's side panels 30. The details of the brackets 36 will be described later, suffice for now to state that each bracket includes an opening therein through which the conventional closet rod 34 passes.

Turning now to FIGS. 1 and 2, the structural details of each of panels 22 will be described. As can be seen, each panel is a planar, generally rectangular, grid-like construction. The grid-like construction is formed by plural rod-like sections 38 which intersect at right angles to one another. The periphery of each panel 22 is formed by contiguous, axially aligned rod-like sections 38, thereby forming four continuous linear edges 40. As can be seen in FIG. 3, each rod-like section is of generally circular cross section.

In accordance with the preferred embodiment of this invention, each panel 22 is formed as an integral unit by molding the same of a strong, tough, yet somewhat resilient plastic, e.g., polypropylene. Other strong moldable plastics can also be used. Moreover, the grid-like panel can be constructed of other materials, e.g., wire or vinyl coated wire, etc., if desired.

Also in accordance with the preferred embodiment of this invention the clips 24 are molded of the same plastic material as the panels. Those clips are best seen in FIGS. 2 and 3 and basically comprise an elongated member having a pair of longitudinally disposed channels 42 and 44 therein. The channels are each of generally circular cross section and formed by respective, elongated arcuate sidewalls 46 and 48. The free edge of the sidewall 46 is in the form of a rounded flange 50, while the free edge of the sidewall 48 is in the form of a rounded flange 52.

The two sidewalls 46 and 48 meet at an intermediate wall 54 which extends the length of the clip and is of thinner width than the thickness of the sidewalls 46 and 48. The top or free edge 56 of the intermediate wall is spaced from either of the flanges 50 and 52 by a distance which is less then the diameter of either of the channels 42 and 44 to form a narrow access slot or mouth 58 for channel 42 and a similar access slot or mouth 60 for channel 44.

Each channel of the clip is adapted to receive and hold therein a rod-like section of an associated panel, with the longitudinal axis of the rod-like section lying along the longitudinal axis of the channel. To that end, the diameter of the rod-like sections of the panel are made slightly less than or equal to the inside diameter of the channel, but slightly greater than the width of the channel's access mouth. Accordingly, the rod-like section can be forced through the access opening into the channel, with the channel's sidewall flexing outward slightly to enable insertion and the returning to lock the rod-like section in place. This snap-fitting action produces a connection which is resistant to accidental disconnection, but which can be readily disassembled, when desired. Moreover, as a force is applied to the clip, the clip tends to grip the rod-like section more tightly.

It should be pointed out at this juncture that while the rod-like section of the panel is snuggly held within the channel it can nevertheless be rotated or pivoted about its longitudinal axis within the clip. This freedom of pivoting facilitates the assembly process. In this regard, in order to assemble a basket 26 like shown in FIG. 1, four grid-like panels 22 are disposed flat on a floor or other support surface. Three of the panels (i.e., the bottom panel and the two side panels) are arranged in a linear array beside one another with their respective side edges disposed contiguous to one another. A fourth panel (i.e., the rear panel) is disposed adjacent the middle of the three other panels and with one of its side edges disposed immediately adjacent to a free side edge of the middle of the three other panels. The panels are then interconnected by respective pairs of clips 24 used on each adjacent pair of side edges. To that end, each clip is held over the immediately adjacent rod-like sections of the panels, with the access opening to the clip's channels facing downward. The clip is then pressed downward so that its sidewalls spring open, whereupon the rod-like sections pass through the access slots and into the clip's channels. After that connection is facilitated the remaining clips of the three linearly arrayed panels are assembled. The fourth (rear) panel is then connected to the middle (bottom) of the three other panels in the same manner. After all of the four panels are connected, the fourth panel (the rear panel 32) is pivoted upward 90° while an outer one of the three linear arrayed panels (that is, a side panel 30) is also pivoted upward 90° to the bottom panel. The two side edges of the rear panel and the side panel which are disposed contiguous with each other are then connected together by a pair of clips in a manner similar to that described heretofore. The other side panel is then pivoted upward with respect to the bottom panel and its side edge is connected to the other side edge of the rear panel by a pair of clips to complete the formation of the open top/open front basket 26.

Other similarly constructed baskets can be suspended below basket 26 by the use of the clips 24 to form a multiple compartment storage system. In the embodiment shown in FIG. 1, the system 20 has two such baskets, each holding linens, e.g., towels therein.

Figure 4:
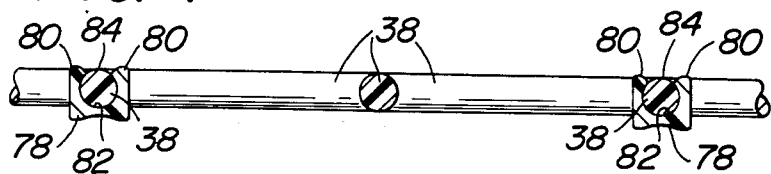
FIG. 4 is an enlarged sectional view taken along line 4—4 of FIG. 1.

In accordance with the preferred embodiment of this invention, the brackets 36 are molded as integral units from the same material as that of the panels 22 and the clip 24. As can be seen in FIG. 1, each bracket basically comprises an arcuate or loop-like central portion 70 terminating at each end thereof and a projecting leg 72. Each leg in turn terminates in a straight section 74 which is connected to a respective end of the loop portion 70 by an angularly extending bridging section 76. Each straight section includes a clip 78 (FIG. 4) at its free end. Each clip 78 is in the form of a spaced pair of arcuate inside surface sidewalls 80 which extend a substantial portion of the length of the leg's straight section and form therebetween an elongated channel 82 similar to the channels in the clip 24. The space between the free edges of the side walls 80 of the clip is less than the diameter of its channel to provide an access mouth 84 for the channel.

In order to facilitate the securement of the brackets to the panels the spacing between the leg section 76 of the brackets is selected to be equal to an integer multiple of the spacing between the rod-like sections making up the panel's grid. Accordingly, the bracket can be readily secured to a panel at various positions thereon by merely snapping its leg clips on respective spaced rod-like portions of the panel and with the loop portion of the bracket extending above the edge of the panel (see FIG. 1).

The diameter of the loop-like portion is sufficiently large to accommodate a conventional closet rod therein. Thus, a single basket 26 or plural connected baskets (like that shown in FIG. 1) can be suspended from the closet rod.

Figure 5:
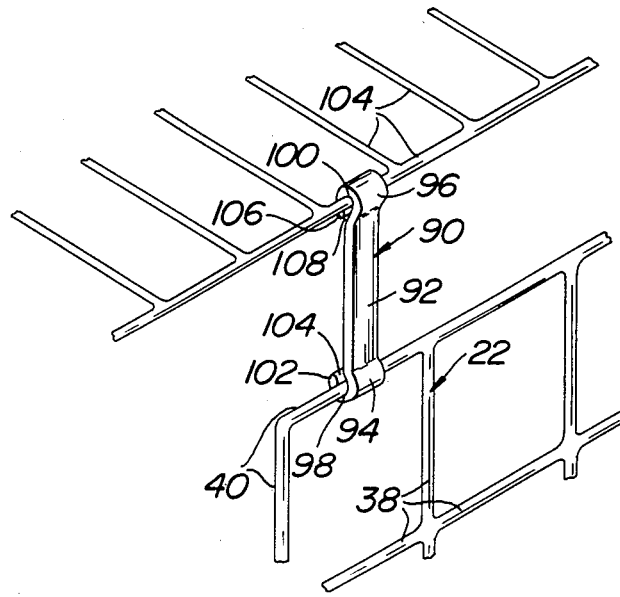
FIG. 5 is a partial perspective view of one of the panels making up the receptacle of the system shown in FIG. 1, but utilizing an alternative hanger clip for suspending the system from conventional wire shelving.

An alternative means of suspending a basket or plural baskets of the subject invention is through the use of alternative brackets 90. These alternative brackets are shown in FIG. 5 and are each molded as an integral unit formed of plastic, preferably like that forming the other portions of the system. The alternative brackets are specifically configured for suspending the system from conventional wire shelving. To that end, as can be seen in FIG. 5, each of the brackets 90 is in the form of an elongated strap-like section 92 terminating at one end in a panel-mounting clip 96. Each clip is formed by an arcuate bend in the elongated strap section to form a circular recess. Thus, the panel mounting clip includes a recess 98 while the shelving mounting clip includes a recess 100.

The diameter of the recess 98 in the panel mounting clip is substantially the same or slightly greater than the diameter of the rod-like sections of the panel. The clip 94 includes a free end portion 102 which is spaced from the planar end of the associated strap section to form an access mouth 104. The width of the access mouth is less than the diameter of the recess but greater than the diameter of the rod-like sections of the panel. Accordingly, the clip can be readily secured to the panel by snapping its rod-like section into the recess in the same manner as described heretofore. The springiness of the clip portion enables the ready assembly of the clip on the panel, while detering accidental disconnection. Moreover, like clip 24 clip 94 can pivot with respect to the rod-like section disposed therein.

The diameter of the recess 100 in the shelf mounting clip 96 is substantially the same or slightly greater than the diameter of the wire elements 104 making up the conventional wire shelving. The clip 96 includes a free edge 106 which is spaced from the planar end of the associated strap to form an access mouth 108 whose width is slightly less than the diameter of the recess 100 but greater than the diameter of the wire element 104 of the wire shelving. Accordingly, the clip can be secured to the shelving by snapping its wire element into the recess of the clip in the same manner as described with reference to the clip 94. The springiness of the clip portion 96 enables the ready assembly of the clip on the wire shelving while detering the accidental disconnection therefrom. Moreover, like clip 24, the clip 96 can pivot with respect to the supporting wire element 104 disposed therein.

As will thus be appreciated from the foregoing, one can readily suspend a storage system composed of one or plural compartments formed by the panels 22 from conventional wire shelving by snapping the shelving mounting clips 96 onto associated wire elements of the shelving and snapping the panel mounting clips onto appropriate rod-like sections of the panels.

In yet another alternative embodiment of the subject invention, the storage system formed by the panels 22 and the clips 24 can be configured to be free standing. In such a construction it is preferred that five panels be used so as to form four sidewalls and a bottom wall. It is, of course, to be understood that the resulting construction can be laid on its side so that the open side can face forward. Still further, the open side can face downward to form a cube-like support structure as shown in FIG. 6.

Figure 7:
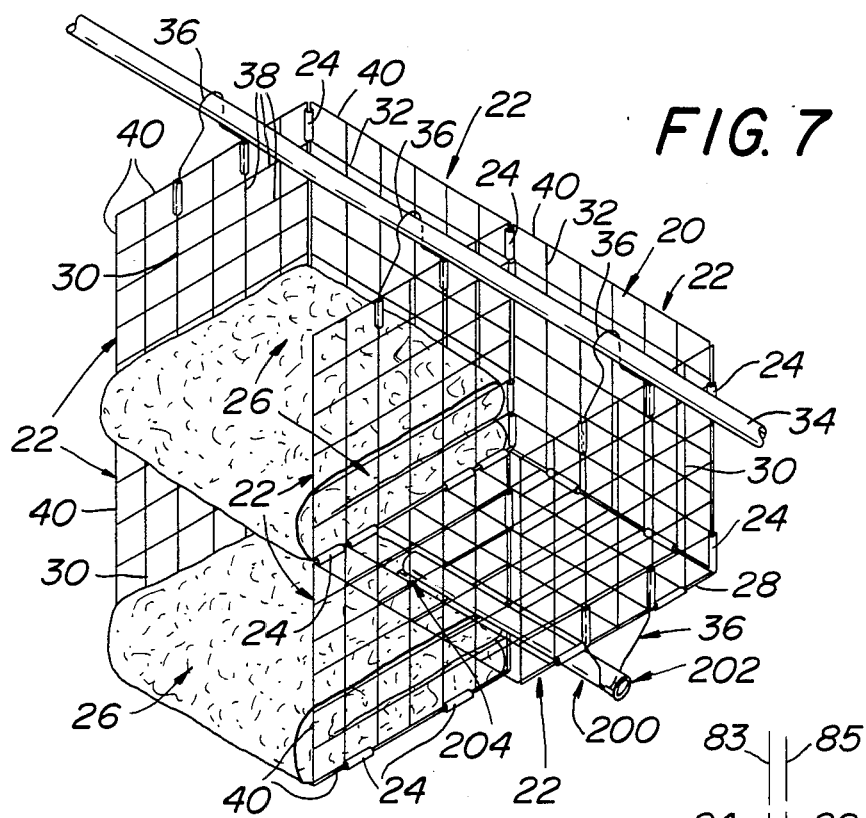
FIG. 7 is a perspective view of a storage system including a closet rod accessory.

As shown in FIG. 7 the bracket 36 can also be utilized along with associated accessory components to be described hereinafter to form an accessory closet rod 200. The closet rod accessory 200 basically comprises a tubular elongated rod 202, one bracket 36 for suspending one end of the rod 202 and a mounting clip 204 for supporting the other end of the rod.

As can be seen clearly in FIGS. 8-11 the rod 202 is an elongated tubular member, again preferably formed of a plastic material like the plastic forming the panels and clips. An arcuate notch or recess 206 is located adjacent each end of the rod 204. Each recess 206 extends about the periphery of the rod 204 for approximately 180°, with both notches being at the same peripherally directed orientation.

In accordance with the embodiment of the storage system shown in FIG. 7 the bar 204 is mounted below the bottom panel 28 of the right most basket 26 to serve as a bar for hanging clothing or other articles thereon. Thus, the right-most end of the rod 204 shown in FIG. 3 is suspended by bracket 36 from the sidewall 30 of the right-most basket 26. The bracket 36 is secured to the rod-like sections 38 of that sidewall 30 so that its loop-like portion projects downward and below the bottom panel 28. The arcuate portion 70 of the bracket 36 is disposed within the right most notch 206 of the rod 204. The width of the arcuate notch is sufficiently large to permit ready insertion of the bracket portion 70 but tight enough to hold it against accidental disconnection.

Figure 8:
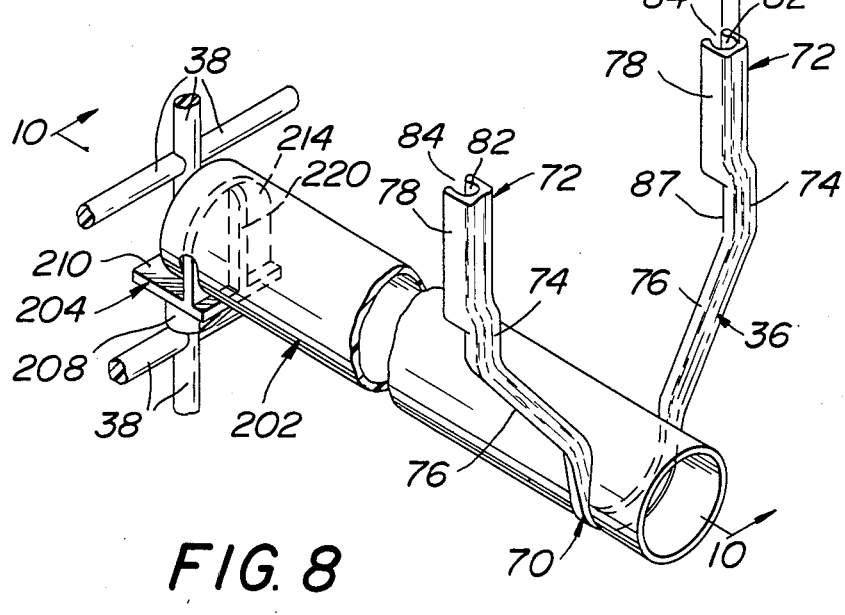
FIG. 8 is an enlarged perspective view of a portion of the closet rod accessory shown in FIG. 7.

As seen clearly in FIG. 8 the other end of the rod 202 is mounted and supported by the mounting clip 204. That clip is arranged to be releasably secured onto the side panel 30 of the lower of the left-most baskets 26 shown in FIG. 7.

The clip 204 basically comprises a base portion 208 (FIG. 10) having a projecting flange 210 which is braced by an angularly extending wall 212 so that the top surface of the flange can rigidly support the end of the rod 202 thereon. A mounting tab 214 projects upward from the flange 210 and serves as the means to connect the end of rod 202 to the clip 204 (as will be described later). The mounting clip 204 also includes a vertically extending mounting channel 216 (FIG. 11) adapted to snuggly receive an associated rod-like section 38 of the side panel 30 to releasably mount the clip thereon. The channel 216 is constructed in a similar manner to that described with reference to clips 24 and 78 so as to enable the mounting clip to be readily, yet snuggly snap-fit on the rod-like section.

As can be seen by reference to FIGS. 7 and 10 the height of the top surface of the flange 210 above the bottom edge 218 of the clip is selected so that when the clip is in place on the rod-like section of the panel 22 with its edge 218 resting on the horizontally extending rod-like section 38, the rod 202 is disposed the same distance below the bottom panel 28 as the rod end supported by bracket 36. Thus the rod 200 is horizontally disposed.

In order to hold the rod in place on the tab 214 against accidental disconnection, the tab includes an upwardly tapered vertical ridge 220 on its outside face. The top edge of the ridge is rounded (FIG. 10). The thickness of the tab from the free edge of its inside face is slightly tapered and sufficient to snuggly fit within the notch 206 (See FIGS. 10 and 11).

As shown clearly in FIG. 8 each clip 78 of bracket 36 is offset laterally from the plane of its leg portion 74. Thus the central longitudinal axis 83 of each clip's channel 82 is disposed laterally inward of the axis 85, which latter axis is the longitudinal axis of leg portion 74 and is coplanar with the inside surface 87 (FIG. 10) thereof. Thus, when the bracket is secured to a side panel 30 the bracket's legs lie just beyond the outermost surface of the panel.

In accordance with the preferred embodiment of the invention the accesssory mounting clip 204 is formed as an integral unit and molded of the same plastic as that forming the clips, brackets and panels of the system 20.

In FIG. 12 there is shown another embodiment of system 20 suspended from a conventional closet rod 34 via plural suspension brackets 36 and including an alternative hanger rod accessory mounted beneath the bottom wall of a basket 26 and without the need for any laterally located basket and associated mounting clip 204 like that described heretofor. That accessory includes a pair of accessory suspension brackets 300 and a rod 202.

Figure 13:
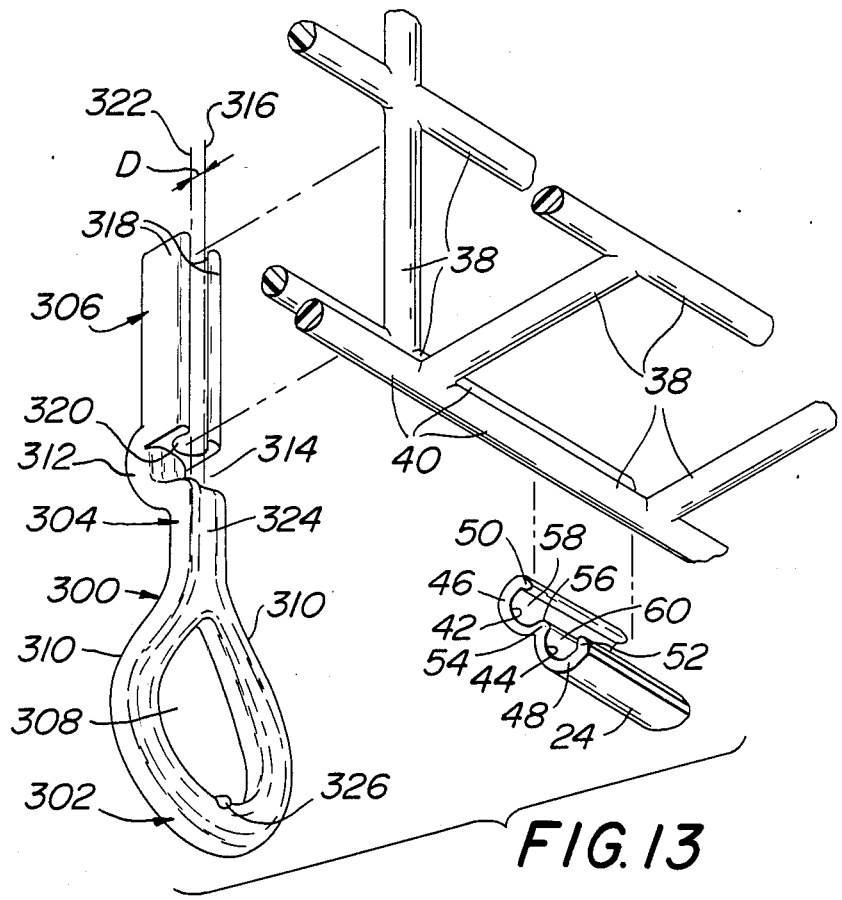
FIG. 13 is an enlarged exploded perspective view of a portion of the system shown in FIG. 12 and with one of the accessories shown therein.

The suspender bracket 300 is best seen in FIG. 13 and basically comprises a loop portion 302, an intermediate or bridging leg 304 and a clip 306 all formed as an integral unit, such as by molding a plastic like that of the other components and accessories of the system. The loop portion 302 is of generally tear-drop shape and has a tear-drop shaped central opening 308. The central opening 308 is arranged to mount an accessory hanger rod 202 therethrough.

The loop 302 includes a semi-circular arcuate portion whose respective ends terminate in straight sections 310 which merge together at one end of the bridging leg 304. The other end of the bridging leg 304, that is the portion furtherest from the loop portion is offset at 312 from the plane of the loop and bridging portions 302 and 304, respectively, to form a recess 314. The clip 306 is an elongated member located at the offset end 312 of the bridging leg 304 and extends parallel to the longitudinal axis 316 thereof. Thus, the clip 306 basically comprises a pair of spaced sidewalls 318 which extend the entire length of the clip and form therebetween an elongated channel 320. The sidewalls 318 of the clip 306 are similar to the sidewalls 80 of the clips 78 of bracket 36. Similarly, the channel 320 is similar in size and shape to the channel 82 also described with reference to bracket 36.

The central longitudinal axis of the channel 320 is denoted by the reference numeral 322. As can be seen the axis 322 is laterally offset (by a distance D) from axis 316, which latter axis constitutes a longitudinal axis of the bridging leg 304 and is located in the plane of the inside surface 324 thereof.

Securement of the bracket 300 onto the side panel 30 of a basket 26 is accomplished as follows: the bracket 300 is disposed outside the sidewall of the basket 26 to which it is to be connected and snapped in place on an associated vertically extending rod-like section 38 of the basket's side panel. This action is shown in FIG. 13. Thus as can be seen each clip 306 is connected to the outside of each sidewall of the basket, with the centermost of the lowermost vertically oriented rod-like sections 38 located within the channel 320 of the clip 300 and with the offset recess 314 receiving the rod-like bottom edge 40 of the side panel. By virtue of the fact that the central longitudinal axis 322 of the clip 306 is offset from longitudinal axis 316 by the distance D, when the bracket 300 is secured to the basket side panel as just described the loop portion 302 and the bridging portion 304 of the bracket 300 lie in a plane inward of the plane of the side panel.

When a pair of brackets 300 are secured to the opposite side panels of a basket 326 and directed downward, they provide the means for supporting the respective ends of an accessory closet rod 202, such as described heretofor. Thus, in such a case the arcuate loop portion 302 of each bracket 300 is received in a respective notch 206 of the rod 202. The thickness of the loop portion is selected so as to be snuggly received within the notch 206 to prevent accidental dislocation therefrom, yet permit ready assembly and disassembly.

In accordance with the preferred embodiment of the subject invention, and by virtue of the construction clip 204 and of the brackets 36 and 300 (particularly the offset arrangement of their respective clips) all described heretofor, a single length rod 202 can be used with all the embodiments shown herein.

In FIG. 15 there is shown the use of two brackets 300 and a rod 202 but secured to and oriented such as to form a carrying handle accessory 400 for a four sided, opened-top basket 26. Thus, a pair of brackets 300 are secured to respective side panels 30 of the basket 26 with their loop-like portions 302 extending beyond the top edge 40 of those side panels. The loop-like portions of the brackets 300 are located within respective notches 206 in the rod 202. In order to prevent the rod from falling off the brackets 300 each bracket 300 includes a projecting dimple 326 on the inside surface of the arcuate portion of the loop section 302 and contiguous with the opening 308. Each dimple serves as a locking means, which as can be seen in FIG. 16, extends under the inside edge of the associated recess 206 and the rod 202 to prevent the rod from dropping thereoff.

When a modular storage system 20 is suspended from a conventional closet rod by any of the suspension brackets or means hereof, it will be appreciated that the system is free to swing on the rod. Thus, accessory stabilizing means are provided for optional use with the system to preclude any such swinging action. That accessory stabilization means is shown clearly in FIGS. 12 and 14 and is denoted by the reference numeral 500.

As can be seen therein the stabilization means 500 is in the form of a clip arranged to be fixedly secured to a stationary structure, e.g., sidewall 502 of the closet or furniture in which the system 20 is suspended. The clip 500 is preferably formed as an integral unit of a plastic like that used for the other accessories and components of the system 20 disclosed herein and basically comprises a base portion 504 and a clip portion 506. The base portion 504 is generally planar and includes an opening 507 therein. The opening is adapted to receive any suitable fastening means such as a screw, nail, etc. for mounting the clip 500 onto the wall 502 via a washer or spacer (not shown).

The clip portion 506 is similar in construction to one-half of a clip 24 as described heretofor. Thus the clip 506 includes a central channel 508 formed by a pair of elongated sidewalls 510 and 512. Sidewall 510 is arcuate, with the free edge thereof being in the form of a rounded flange 514. The sidewall 512 is of thinner width than the thickness of the sidewall 510. The top or free edge 516 of the wall 512 is spaced from the flange 514 by a distance which is less than the diameter of the channel 508 to form a narrow access slot 518 for the channel 508. The channel 508 is adapted to receive and hold therein any rod-like section 38 forming the side panel 30 of a basket 26.

Figure 14:
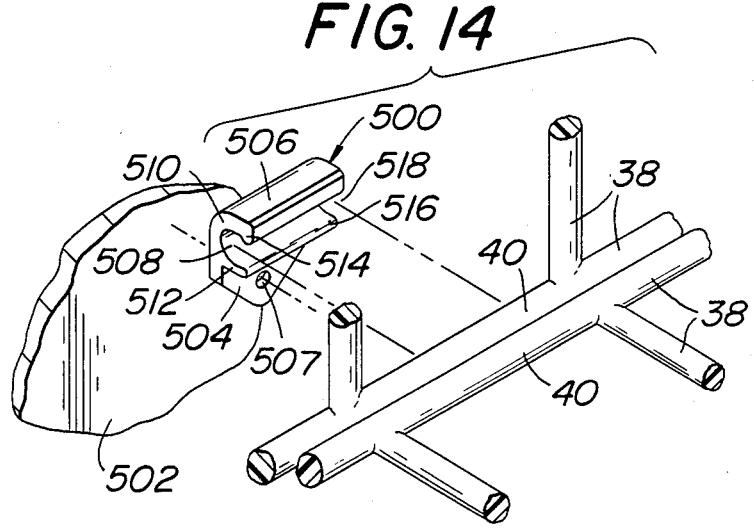
FIG. 14 is an enlarged exploded perspective view of a portion of the system shown in FIG. 12 and showing another accessory.

In the embodiment shown in FIG. 14 the channel 508 receives therein the rod-like section forming a portion of the periphery 40 of the basket. Thus, that rod-like section is forced through the access opening 518 of the clip into the channel 508. The channel's sidewalls flex slightly outward to enable that insertion, then return to lock the rod-like section in place. This snap-fitting action produces a connection which is resistant to accidental disconnection, but can be readily disassembled, when desired. The use of the spacer (not shown) interposed between the clip 500 and the wall 502 ensures that the basket is held parallel to the wall without deformation caused by the spacing of the flange of the closet rod.

Notwithstanding their use as stabilizing means, as just described, the clips 500 are preferably used as means for directly mounting a basket 26 of system 20 onto a wall as shown in FIG. 17. In such an arrangement a pair of clips 500 are fixedly secured such as by the use of screws, etc. (not shown) to a vertical surface, such as the wall 502 of a closet or piece of furniture. The clips 500 are spaced from each other and with their channels 508 aligned. The spacing between the clips should be less than the width of a panel so that respective aligned rod-like sections 38 of the back panel 32 of the basket 26 are located within the channels of the clips 500. In the interest of stability the rod-like sections 38 selected for insertion into the clips' channels should preferably be located above the midpoint of the height of the basket.

As will be appreciated from the foregoing, the system of the subject invention is simple in construction, light in weight, and can be made at very low cost. By virtue of its modularity the system can be configured to any suspended or free-standing arrangement of one or multiple storage compartments. Moreover, by virtue of its knock-down structure the system can be readily and inexpensively packaged, with the resulting package being very compact and light in weight. Needless to say, this latter feature is of considerable importance from a standpoint of transportation, storage and merchandising.

By virtue of the circular nature of the grid-like construction of the panels and the smooth corners produced thereby the storage system of the subject invention does not present any snagging or damage risk to delicate materials, e.g., linens, stockings, etc., stored therein.

Moreover, the releasable securement means used for connecting the panels together to form the compartments and the releasable securement brackets used for mounting the storage compartments enables one to readily disassemble the system, to store it away or to reconfigure it for a different application, when desired.

Further still the accessories of the system provide even greater flexibility in the configuration of the system to the needs of the user.

Without further elaboration, the foregoing will so fully illustrate my invention that others may, by applying current or future knowledge, readily adapt the same for use under various conditions of service.

I claim:

1. A knockdown storage system for suspension from a conventional closet rod, said system comprising: at least three generally planar panels; releasable securement means connecting said panels into a storage receptacle having a pair of side panels and a bottom panel, each of said panels being formed of a grid-like plastic member which is generally planar and has a rectangular profile, with the marginal edges of each of said panels including rod-like sections of generally circular cross-section, said releasable securement means comprising a clip formed of an elongated plastic member having a pair of longitudinally extending channels, each of said channels being configured to snugly receive a respective rod-like section of a pair of said panels to secure said panels together to readily assembly said receptacle; and a first pair of plastic hanger brackets, each of said brackets including a loop-like portion through which said conventional closet rod extends when said system is suspended vertically therefrom and at least one leg portion depending vertically from said loop-like portion and further including clip means on said depending leg portion having a vertical channel therein releasably securing said bracket to one of said grid-like panels, whereby said storage receptacle is suspended from said rod when said vertical channel is secured to said grid-like panel.

2. The system of claim 1 wherein said grid-like panel includes plural intersecting rod-like sections and wherein said clip means of said leg portion is releasably secured to one of said rod-like sections.

3. The system of claim 1 wherein said receptacle comprises a basket having three side panels and a bottom panel, each of said panels being disposed generally perpendicularly to a connected panel.

4. In a knockdown storage system comprising a receptacle including at least three generally planar panels formed of a grid-like plastic member of rectangular profile, with two of said panels being disposed vertically and with a space therebelow, and with portions of each of said panels including rod-like sections of generally circular cross-section, the improvement comprising hanger rod means releasably secured to said receptacle, said hanger rod means comprising an elongated rod member and at least one hanger bracket therefor, said bracket including a loop-like portion and a pair of leg portions extending therefrom, each leg portion defining a verticle axis, each leg portion including clip means having an elongate channel therein parallel to said vertical axis and configured to snap-fit a rod-like section of one of said vertically disposed panels therein and releasably fastening said bracket to said panel, said rod member including at least one notch therein adjacent one end thereof and receiving said loop-like portion of said bracket thereby suspending said one end of said rod member in said space below said panels, said hanger rod means also comprising suspension means located adjacent the other end of said rod member for suspending said other end of said rod member below said panels in said space.

5. The hanger rod means of claim 4 wherein said hanger bracket is formed of plastic.

6. The hanger rod means of claim 4 wherein said hanger bracket is formed of plastic.

7. The hanger rod means of claim 4 wherein said means located adjacent the other end of said rod member comprises another similarly constructed bracket.

8. The hanger rod means of claim 4 wherein said loop-like portion of said bracket is offset from said clip means of said leg portion.

9. Ther hanger rod means of claim 8 wherein said storage system is inverted and wherein said hanger rod means serves as a carrying handle for said storage system.

10. In a knockdown storage system comprising a receptacle including at least three generally planar panels formed of a grid-like plastic member of rectangular profile, with two of said panels being disposed vertically and with a space therebelow, and with portions of each of said panels including rod-like sections of generally circular cross-section, the improvement comprising hanger rod means releasably secured to said receptacle, said hanger rod means comprising an elongated rod member and at least one bracket therefor, said bracket including a loop-like portion and at least one leg portion extending therefrom, said leg portion defining a vertical axis, said leg portion including clip means having an elongate channel therein parallel to said vertical axis and configured to snap-fit a rod-like section of one of said vertically disposed panels therein for releasably fastening said bracket to said panel, said rod member including at least one notch therein adjacent one end thereof and being adapted to receive said loop-like portion of said bracket to suspend said one end of said rod member in said space below said panels, said hanger rod means also comprising means located adjacent the other end of said rod member for suspending said other end of said rod member below said panels in said space, said means located adjacent the other end of said rod member being comprised of a fourth generally planar panel formed of a grid-like plastic member located below one of said vertically disposed panels, said fourth panel also being vertically disposed; and second clip means for releasable securement to said fourth panel.

11. The hanger rod means of claim 10 wherein said second clip means includes a longitudinally extending channel configured to tightly receive one of said rod-like sections of said fourth panel, said clip also including projecting means adapted to be received within a notch in said other end of said rod member.

12. The hanger rod means of claim 11 wherein said second clip means is formed of plastic.

* * * * *